US012623576B2

(12) United States Patent
Dabrowski et al.

(10) Patent No.: US 12,623,576 B2
(45) Date of Patent: May 12, 2026

(54) VEHICLE SEAT BACK FRAME MEMBER WITH ADJUSTABLE STIFFNESS SYSTEM AND METHOD

(71) Applicant: GM GLOBAL TECHNOLOGY OPERATIONS LLC, Detroit, MI (US)

(72) Inventors: Eryk Jerzy Dabrowski, Bloomfield Hills, MI (US); Hans Sherman Grohs, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 18/528,389

(22) Filed: Dec. 4, 2023

(65) Prior Publication Data

US 2025/0178497 A1     Jun. 5, 2025

(51) Int. Cl.
*B60N 2/427*          (2006.01)
*B60N 2/68*           (2006.01)
*B60N 2/888*          (2018.01)

(52) U.S. Cl.
CPC ......... *B60N 2/427* (2013.01); *B60N 2/42709* (2013.01); *B60N 2/68* (2013.01); *B60N 2/888* (2018.02)

(58) Field of Classification Search
CPC .............................. B60N 2/68; B60N 2/42709
See application file for complete search history.

(56) References Cited

U.S. PATENT DOCUMENTS

| | | | | |
|---|---|---|---|---|
| 6,074,004 A | * | 6/2000 | Carmichael ........ | B60N 2/42745 297/216.13 |
| 6,601,918 B2 | * | 8/2003 | Mattsson ............... | B60N 2/666 297/410 |
| 6,604,787 B1 | * | 8/2003 | Brockman ............... | B60N 2/68 297/216.13 |
| 6,709,053 B1 | * | 3/2004 | Humer ............... | B60N 2/42709 297/216.14 |
| 6,983,967 B2 | * | 1/2006 | Scheidmantal .... | B60N 2/42709 296/187.05 |
| 7,393,039 B2 | * | 7/2008 | Ravid ..................... | F41H 7/046 296/187.05 |
| 7,887,139 B2 | * | 2/2011 | Yamada .................. | B60R 22/26 297/452.2 |
| 8,267,479 B2 | * | 9/2012 | Yamada ................. | B60N 2/682 297/468 |
| 10,011,204 B2 | * | 7/2018 | Line ......................... | B60N 2/58 |
| 10,137,812 B2 | * | 11/2018 | Matthey ................. | B60N 2/682 |

(Continued)

FOREIGN PATENT DOCUMENTS

| | | | |
|---|---|---|---|
| BR | 102016003133 A2 | * 9/2017 | .............. B60N 2/20 |
| DE | 19817503 C1 | 9/1999 | |

(Continued)

*Primary Examiner* — Timothy J Brindley

(74) *Attorney, Agent, or Firm* — Ingrassia Fisher & Lorenz, LLP | IF&L

(57) ABSTRACT

Systems and methods for varying stiffness of a structural member. A vehicle seat includes the structural member. The structural member has two walls. A link extends between the walls and has three segments, with one segment extending between the other two. Connectors are disposed between disposed between the other two segments of the link and two walls of the structural member. The connectors may be adjustable to vary tension in the link and to vary stiffness of the structural member.

20 Claims, 4 Drawing Sheets

(56) References Cited

U.S. PATENT DOCUMENTS

| | | | | |
|---|---|---|---|---|
| 10,414,307 B2 * | 9/2019 | Suzuki | ..................... | B60N 2/68 |
| 10,625,648 B2 * | 4/2020 | Inoue | ..................... | B60N 2/682 |
| 10,682,938 B2 * | 6/2020 | Katoh | ..................... | B60N 2/682 |
| 11,607,980 B2 * | 3/2023 | Gao | ................... | B60N 2/42727 |
| 11,618,354 B2 * | 4/2023 | Glaub | ................... | B60N 2/502 |
| | | | | 297/216.1 |
| 11,794,616 B2 * | 10/2023 | Tanabe | ................... | B60N 2/888 |
| 12,049,160 B2 * | 7/2024 | Kijima | ................ | B60N 2/3075 |
| 2005/0225133 A1 * | 10/2005 | Aufrere | ................... | B60N 2/68 |
| | | | | 297/216.1 |
| 2024/0123880 A1 * | 4/2024 | Arai | ..................... | B60N 2/686 |
| 2024/0367563 A1 * | 11/2024 | Leng | ...................... | B60N 2/90 |

FOREIGN PATENT DOCUMENTS

| | | | | |
|---|---|---|---|---|
| DE | 202007009701 U1 * | 9/2007 | ............ | B23K 20/10 |
| WO | 2018139385 A1 | 8/2018 | | |
| WO | WO-2020201017 A1 * | 10/2020 | .............. | B60N 2/68 |

* cited by examiner

VEHICLE SEAT BACK FRAME MEMBER WITH ADJUSTABLE STIFFNESS SYSTEM AND METHOD

INTRODUCTION

The present disclosure generally relates to vehicle seats with a frame made of structural members and more particularly relates to structural seat members with adjustable stiffness.

A vehicle seat is designed for structural integrity and performance under a wide range of anticipated and potential loading scenarios that may arise during operation of the vehicle. Various seat design parameters have an effect on both structural integrity and occupant kinematic response. When a vehicle in which an occupant is seated experiences a sudden and rapid forward acceleration, the head of the occupant may tilt to the rear followed up by a reversed tilt back to the front in reaction thereto. The seat and its head restraint may be helpful in minimizing the tilting action and therefore in influencing the occupant's kinematic response.

Design parameters for a desired performance may be determined during product development using modelling and testing. Once determined, the seat's components may be tailored to each seat and vehicle combination. For each application, certain component parts of the seat are unique and cannot generally be reused in other applications without design changes.

Accordingly, it is desirable to provide vehicle seats with structural members that meet a range of different performance requirements. In addition, the structural members of the vehicle seats may preferably be reusable in a variety of applications without requiring redesigning. Furthermore, other desirable features and characteristics of the present invention will become apparent from the subsequent detailed description and the appended claims, taken in conjunction with the accompanying drawings and the foregoing introduction.

SUMMARY

Systems and methods are provided for varying stiffness of a structural member. A vehicle seat includes the structural member. The structural member has two walls. A link extends between the walls and has three segments, with one segment extending between the other two. Connectors are disposed between disposed between the other two segments of the link and two walls of the structural member. The connectors may be adjustable to vary tension in the link and to vary stiffness of the structural member. The number of walls, links, and/or connections is not limited to the aforementioned example, but may be a variety of combinations as it relates to the varying stiffness of the structural member.

In additional embodiments, a head restraint of the vehicle seat is coupled with the structural member and a frame is included in the vehicle seat, where the structural member comprises a part of the frame.

In additional embodiments, the structural member includes a channel forming a pocket, and the link is disposed in the pocket.

In additional embodiments, the structural member includes a web and a third wall. The structural member includes a channel forming a pocket. One wall is a leg of the channel. Another wall is the web. The third wall is a second leg of the channel. The web extends between the two legs forming a C-shape. The link is connected with the two legs and with the web.

In additional embodiments, the vehicle seat has a back and the structural member is an upper cross member of the back.

In additional embodiments, a head restraint is included on the vehicle seat, where the connector(s) is/are configured to tune the stiffness to balance a response of the head restraint to expected forces with a response of the head restraint to rebound forces.

In additional embodiments, the link is a stamping and is disposed to extend along the structural member.

In additional embodiments, the structural member includes a channel configured to provide the stiffness to the structural member. The structural member includes an angle extending from the channel and configured to increase the stiffness. The link is configured to increase the stiffness.

In additional embodiments, the connectors are configured to place the link in either the tension and a compression.

In additional embodiments, the connectors are threaded fasteners.

In a number of other embodiments, a system with adjustable stiffness includes a vehicle seat having a frame. A structural member of the frame of the vehicle seat has two walls. A link extends between the walls. The link has three segments, where one middle segment extends between the other two outside segments. One outside segment is disposed along one wall of the structural member and the other outside segment is disposed along the other wall of the structural member. One connector is engaged between a segment of the link and a wall of the structural member. Another connector is engaged between another segment of the link and another wall of the structural member. At least one connector is adjustable to vary tension in the middle segment of the link and to vary stiffness of the structural member.

In additional embodiments, a head restraint is included on the vehicle seat. A shaft couples the head restraint with the frame at the structural member.

In additional embodiments, the structural member includes a channel with an opening. The channel forms a pocket and the link is disposed in the pocket.

In additional embodiments, the structural member includes a web and a third wall and includes a channel forming a pocket. Two walls form legs of the channel, and another forms the web. The web extends between the legs so that the legs and the web form a C-shape. The link is connected with the legs and with the web.

In additional embodiments, the vehicle seat has a back, and the structural member is disposed in the back and comprises an upper cross member of the frame.

In additional embodiments, a head restraint is included on the vehicle seat. Both connectors are configured to tune the stiffness to balance a response of the head restraint to expected forces with a response of the head restraint to rebound forces.

In additional embodiments, the link is a metal stamping and is disposed to extend along the structural member in a horizontal direction.

In additional embodiments, the structural member includes a channel that provides the stiffness to the structural member. The structural member includes an angle extending from the channel to increase the stiffness. The link increases the stiffness in addition to the increase of the angle.

In a number of further embodiments, a method for adjustable stiffness includes constructing a vehicle seat. A structural member is included in the vehicle seat. The structural member has a first wall and a second wall. A link extends between the first wall and the second wall. The link has a first segment, a second segment and a third segment, with the second segment extending between the first segment and the second segment. A first connector is added between the first segment of the link and the first wall of the structural member. A second connector is added between the third segment of the link and the second wall. The first connector and/or the second connector are adjusted to vary tension in the second segment of the link and to vary stiffness of the structural member.

In additional embodiments, a head restraint is included on the vehicle seat. A balance between an expected force on the head restraint and a rebound force from the head restraint is evaluated. A baseline stiffness of the structural member is determined based on the evaluating of the balance. A base design of the structural member is created to provide the baseline stiffness. The baseline stiffness is adjusted with the link to provide the varying stiffness of the structural member. The base design is reused in various applications that require different stiffnesses provided by the adjusting the baseline stiffness.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
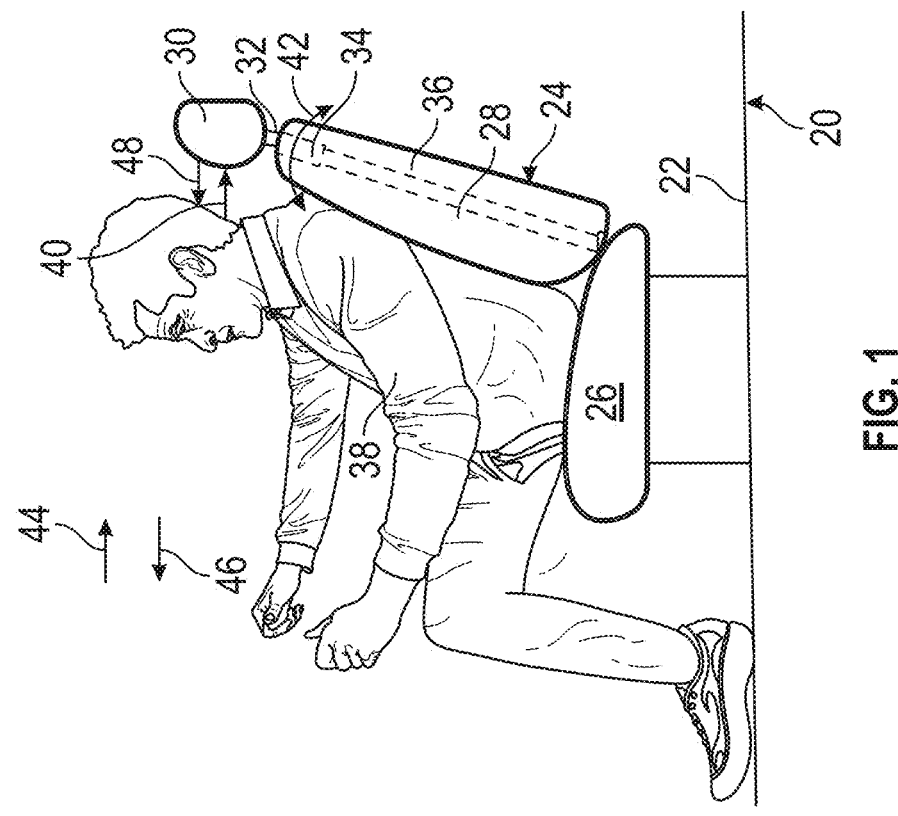
FIG. 1 is a schematic diagram of a vehicle seat, in accordance with various embodiments.

With reference to FIG. 1, illustrated is one example of a vehicle 20 having a body 22 on which a seat 24 is mounted. In general, the seat 24 has a seat bottom 26, a seat back 28 and a head restraint 30. The head restraint 30 is connected with the seat back 28. For example, one or more shafts 32 connect the head restraint 30 with a structural member 34 in a frame 36 of the seat back 28 and provide support to the head restraint 30. The structural member 34 may be referred to in a number of embodiments as a structural section, a structure, a beam, or a frame section. In all cases, the structural member 34 provides an element of the frame 36 that provides form characteristics and load bearing capabilities.

The head restraint 30 may be subjected to loads during operation of the vehicle 20. For example, during a rear impact, the occupant 38, or a part of the occupant 38 such as their head, may move rearward applying a force 40 (expected force) to the head restraint 30. The force 40 translates through the shaft(s) 32 to the frame 36 at the structural member 34. This results in a moment 42 at the structural member 34. The structural member 34, or a part thereof, may elastically deform, such as by twisting, bending, or otherwise yielding. In effect, the deformation is elastic and is somewhat like winding a spring. The deformation allows the head restraint 30 to move in a rearward direction 44 so that the occupant does not encounter a hard stop. As the force 40 diminishes, the system rebounds and the structural member 34 returns to its original state which moves the head restraint 30 in a forward direction 46 as a result of the elasticity. The head restraint 30 may also apply a force 48 (rebound force) to the occupant 38 as it moves to its normal position.

During development of the vehicle 20 and the seat 24, the parameters of the elastic deformation of the structural member 34 may be evaluated for the expected loading through the forces 40. The evaluation may be undertaken using commercially available modelling software and/or real world testing. Stiffness may be evaluated where stiffness is a measure of the resistance offered by the structural member 34 to elastic deformation. The design of the structural member 34 may be based on providing enough stiffness so that under the expected force (force 40) the amount of elastic deformation is limited to limit the amount of movement of the occupant 38, or a part of the occupant 38, so that the head restraint 30 provides its intended restraint function. In addition, the structural member 34 may be designed with a low enough stiffness to avoid excessive rebound force loading in the form of the rebound force (force 48) being exerted on the occupant 38. When the balance is set, the design stiffness of the structural member 34 is specific to the vehicle 20/seat 24 combination. In other seats and/or other vehicles, a different stiffness of the structural member 34 may be desirable based on the applicable evaluation thereof.

Figure 2:
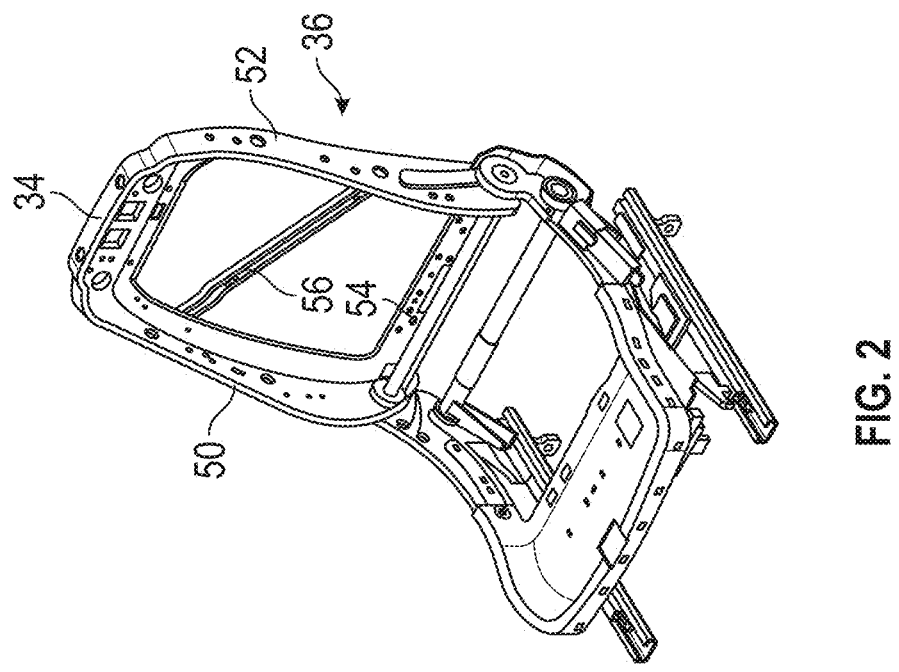
FIG. 2 is a schematic, perspective illustration of a frame of the seat of FIG. 1, in accordance with various embodiments.

Referring to FIG. 2, the frame 36 of the seat 24 is illustrated without its cushioning and fabric covering. The structural member 34 is configured in the form of an upper cross member at the top of the frame 36 of the seat back 28. In this embodiment, the structural member 34 spans between two side members 50, 52. The structural member 34 is fixed to the side members 50, 52 such as by welding, fastening or another method. In some embodiments, the structural member 34 may be formed as one piece with one or both of the side members 50, 52. The frame 36 also includes a lower cross member 54 in the seat back 28 and a brace 56, each of which extend between the side members 50, 52. In other embodiments, the frame 36 of the seat back 28 may include a different number of structural members.

Figure 3:
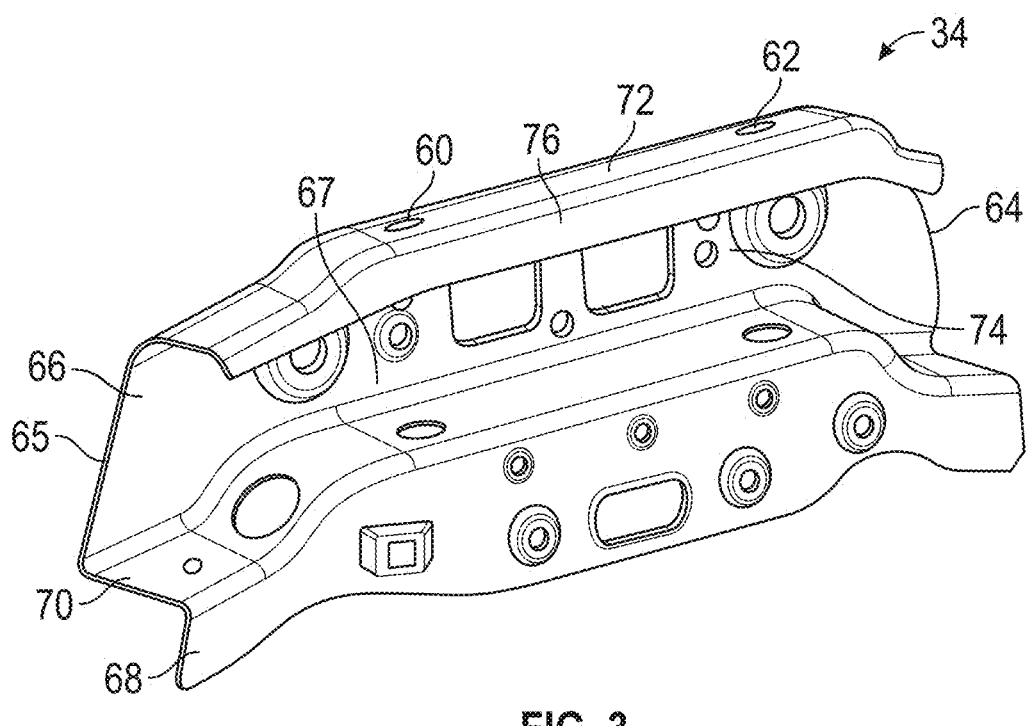
FIG. 3 is a perspective illustration of a structural member of the seat of FIG. 1, in accordance with various embodiments.

Reference is directed to FIG. 3, which shows the structural member 34 in isolation removed from the seat frame 36 and viewed from a rear perspective. The structural member 34 is shown without an adjustable stiffness system which is described below. The structural member 34 is formed as a stamping, such as of steel, with openings 60, 62 for receiving the shaft(s) 32. The structural member 34 extends between a right end 64 that connects with the side member 50 and a left end 65 that connects with the side member 52 as shown in FIG. 2. The structural member 34 is formed generally, in structural section shape terms, as an upper channel 66 that is generally "C" shaped and an integral lower angle 68 that is generally angular in shape. A variety of material selections and processes are available in order to manufacture the structural member and the general shape is not constrained to a "C" shape and can take any shape that enables the intended performance.

In this nonlimiting example, the upper channel 66 and the lower angle 68 share a common leg 70. The upper channel 66 has an open side 67 facing rearward and includes the leg 70 and a leg 72 that is connected with the leg 70 by a web 74. The leg 72 includes a return 76 that extends over an upper part of the open side 67 for increased stiffness. In embodiments, the legs 70, 72 and the web 74 may be referred to generically as walls. The legs 70 and 72 are in a generally horizontal disposition and the web 74 is in a generally vertical disposition as their similarity to walls is concerned. The upper channel 66 forms a pocket 69 enclosed on three sides (the walls) by the legs 70, 72 and the web 74. The lower angle 68 includes the leg 70 and another leg 78. The shapes and features of the parts of the structural member 34 are combined to provide desired parameters such as strength, stiffness and size. The upper channel 66 provides stiffness and the lower angle 68 increases the stiffness of the structural member 34.

Figures 4, 5:
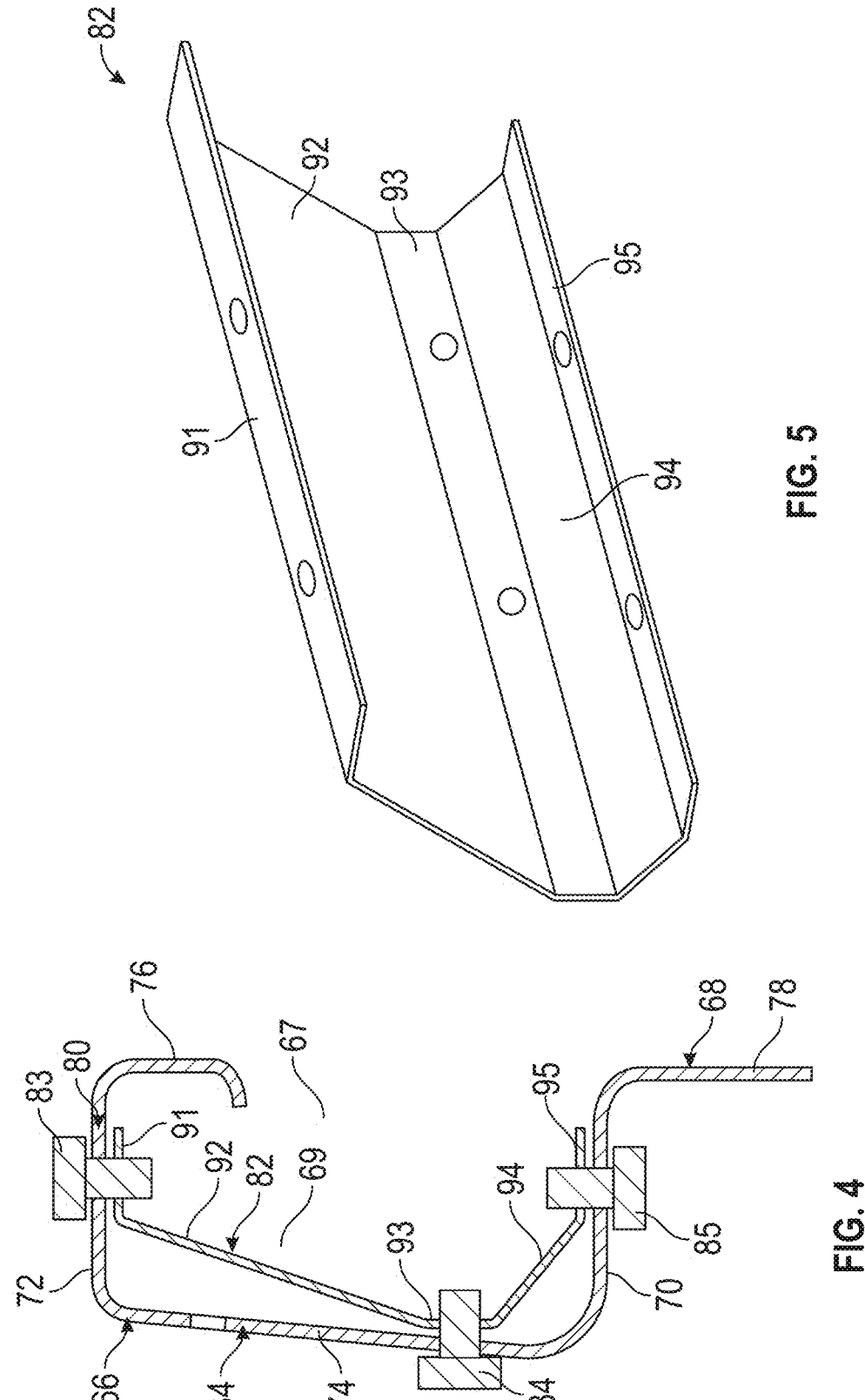
FIG. 4 is a sectional, schematic illustration of the structural member of FIG. 3 with an adjustable stiffener, in accordance with various embodiments.
FIG. 5 is a perspective illustration of the adjustable stiffener of FIG. 4, in accordance with various embodiments.

Referring to FIG. 4, a cross section, particularly of the upper channel 66 part of the structural member 34, is illustrated with an adjustable stiffness system 80. The adjustable stiffness system 80 includes a link 82 and fasteners 83-85. The link 82 is a form of an adjustable stiffener, adjustable by the fasteners 83-85. In the current embodiment, the link 82 is configured as a bracket and is shown in perspective view in FIG. 5. In other embodiments, the link 82 may be configured as cables, straps, springs, or any member or number of members that can be coupled with the elements of the upper channel 66 to apply tension or another force and/or compressive force thereto. In the current embodiment, the fasteners 83-85 are threaded fasteners such as bolts. The fasteners 83-85 are not limited to screw or bolt type fastening but may be embodied as any means of varying the tension within the adjustable stiffness system 80, with said any means being herein considered fasteners, which may also be referred to as connectors. For example, connectors such as straps, clamps, actuators, slides, or other devices may be used. In some embodiments, some of the fasteners/connectors may be fixed means (such as welds) without variability, with variable tension provided through others of the fasteners/connectors.

As shown in FIG. 5, the link 82 is formed as a stamping with five segments 91-95 that are each substantially planar and are bent at various angles relative to their adjacent segment(s) of the segments 91-95. The link 82 is sized to be received within the pocket 69. The segments 91, 93 and 95 are fastening segments and each is configured for connecting to the structural member 34. The segments 91, 93 and 95 each include a number of openings, which may be threaded or include threaded features, to receive connectors such as the fasteners 83-85. The segment 91 is shaped for positioning along the leg 72 of the upper channel 66 within the pocket 69. The segment 93 is shaped for positioning along the web 74 of the upper channel 66 within the pocket 69. The segment 95 is shaped for positioning along the leg 70 of the upper channel 66 within the pocket 69. The segments 92, 94 are configured as tension/compression segments for carrying forces between their respective fastening segments. The segment 92 extends between the segments 91 and 93. The segment 94 extends between the segments 93 and 95.

As shown in FIG. 4, with the link 82 positioned in the pocket 69, the fastener 83 extends through the leg 72 and engages the segment 91, the fastener 84 extends through the web 74 and engages the segment 93, and the fastener 85 extends through the leg 70 and engages the segment 95. In this embodiment, the fasteners 83, 84, 85 thread into their respective segment 91, 93, 95. The fastener 83 may be tightened (increase torque) to pull the segment 91 toward the leg 72 and may be loosened (decrease torque) to allow the segment 91 to move away from the leg 72 or a reverse torque may be applied to compress the segment 92. The fastener 84 may be tightened to pull the segment 93 toward the web 74 and may be loosened to allow the segment 93 to move away from the web 74 or a reverse torque may be applied to compress the segments 92, 94. The fastener 85 may be tightened to pull the segment 95 toward the leg 70 and may be loosened to allow the segment 95 to move away from the leg 70 or a reverse torque may be applied to compress the segment 94. Adjusting the tension/compression applied in the segments 92, 94 adjusts the stiffness/spring rate of the adjustable stiffness system 80 and of the structural member 34.

In embodiments, the fasteners 83-85 form a set disposed at a common placement along the horizontal length of the structural member 34. Any number of fastener sets may be included along the entire length of the structural member 34 between the right end 64 and the left end 65, depending on factors such as the total length and the force levels involved.

In embodiments, increasing torque on the fastener 83 and/or the fastener 84 increases the tension in the segment 92 of the link 82. Increasing torque on the fastener 85 and/or the fastener 83 increases tension in the segment 94. Increasing tension in the segment 92 and/or the segment 94 increases the stiffness of the structural member 34. Decreasing torque on the fastener 83 and/or the fastener 84 decreases tension in the segment 92. Decreasing torque on the fastener 84 and/or the fastener 85 decreases tension in the segment 94. Decreasing tension in the segment 92 and/or the segment 94 decreases the stiffness of the structural member 34. In each case increasing reverse torque puts the respective segment 92, 94 in compression. Either tension or compression application changes the spring rate of the adjustable stiffness system 80 and of the structural member 34.

In an example, the fastener 84 may be fully torqued pulling the segment 93 against the web 74 and the fasteners 83, 85 may be adjusted to set the desired stiffness. Once set, the fasteners 83-85 may be locked, such as by lock nuts (not shown) or by another locking device, such as pins, spot welds, staking, etc. In this way, the response of the head restraint 30 to the force 40 and the amount of the force 48 that is generated may be varied and tuned to fit the application. Therefore, the structural member 34 may be reused in a variety of applications that require different stiffness levels without being redesigned.

To determine the setting for the fasteners 83-85, the balance between the expected force and the rebound force may be evaluated by first determining a baseline stiffness result needed for the application of the seat 24 in the vehicle 20 and for a base design of the structural member 34. This may be done by applying a load to the structural member 34 and/or by running detailed analysis for certain expected load cases using commercially available modelling software and/or conducting testing for the response of the head restraint 30 and the effect on the occupant 38. When the resulting stiffness level does not result in the desired outcomes, a stiffness determination is made of whether a stiffer system (to improve performance in response to the expected force) or softer system (to improve response to the rebound force) results in the desired performance in terms of the effect on the occupant 38. The base design of the structural member 34 is then reusable in various applications by inclusion of the adjustable stiffness system 80. The tension/compression applied (such as by the fasteners 83-85) adjusts the stiffness/ spring rate of the adjustable stiffness system 80 making the structural member 34 tunable to the application. Based on the stiffness evaluation, more or less tension or compression is applied to the system. In embodiments, certain fastening points may be allowed to slip, to remain in tension, or to go into compression depending on the need. The stiffness evaluation may be repeated to provide an optimized pre-loading for performance improvement. An experimental design (DOE) assessment may be employed to run min/max values in order to determine which stiffness/spring rate provides the optimal solution. The DOE assessment may include, but is not limited to, the range in material properties of the structural member 34 and other seat 24 components. Material tolerances, geometrical variation, occupant placement variation, and connecting parts such as foam and trim may be considered in the assessment. The results of the variation are then used to determine the optimum stiffness value of the structural member 34 needed in order to decrease standard deviations and provide the desired performance. The number of additional connections, geometry, and/or materials may be taken into account. Depending on the outcome of the assessment, an increase or decrease in the adjustable stiffness is implemented.

Figure 6:
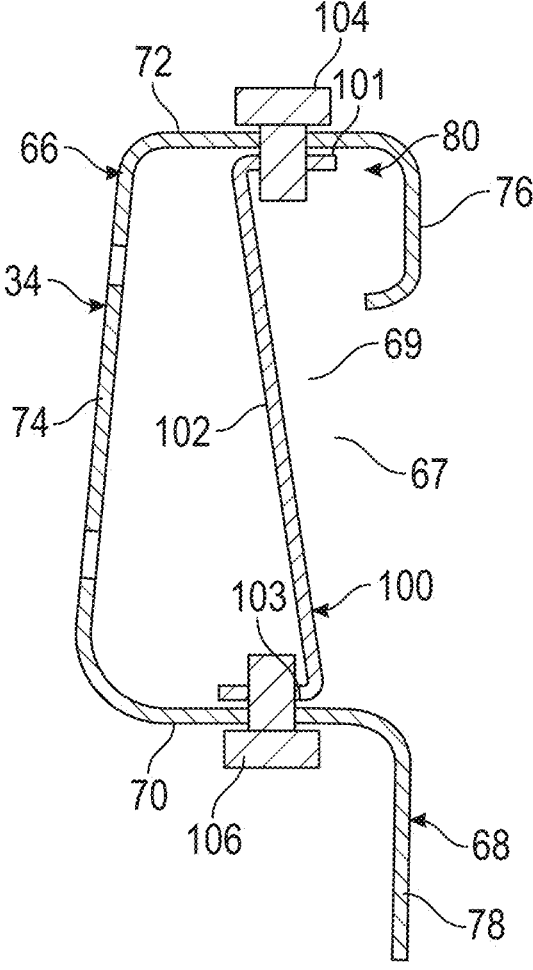
FIG. 6 is a sectional, schematic illustration of the structural member of FIG. 3 with another adjustable stiffener, in accordance with various embodiments.

Referring to FIG. 6 an embodiment shows a link 100 that has a "Z" shaped section with segments 101-103. The link 100 is positioned in the pocket 69, a fastener 104 extends through the leg 72 and engages the segment 101, and a fastener 106 extends through the leg 70 and engages the segment 103. The segment 102 extends between the segments 101 and 103. In this embodiment, the fasteners 104, 106 thread into their respective segment 101, 103. The fastener 104 may be tightened to pull the segment 101 toward the leg 72 and may be loosened to allow the segment 101 to move away from the leg 72. The fastener 106 may be tightened to pull the segment 103 toward the leg 72 and may be loosened to allow the segment 103 to move away from the leg 70.

Increasing torque on the fastener 104 and/or the fastener 106 increases the tension in the segment 102 of the link 100. Decreasing torque on the fastener 104 and/or the fastener 106 decreases the tension in the segment 102 of the link 100 or compresses the segment 102. Increasing tension or compression in the segment 102 increases the stiffness of the structural member 34. Decreasing tension or compression in the segment 102 decreases the stiffness of the structural member 34. The link 100 may be a stamping or in embodiments, the segment 102 may be a cable or other structure in which tension may be varied. Adjusting the tension/compression applied in the segments 102 adjusts the stiffness/spring rate of the selectively variable adjustable stiffness system 80.

Accordingly, adjustable stiffness systems and methods enable tuning a structural member to achieve a desired performance of a head restraint. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system with adjustable stiffness, the system comprising:

a vehicle seat;

a structural member of the vehicle seat, the structural member including a channel configured to provide the stiffness to the structural member, the structural member having a first wall and a second wall, wherein the structural member includes an angle extending from the second wall and configured to increase the stiffness;

a link extending between the first wall and the second wall, the link having a first segment, a second segment and a third segment;

a first connector disposed between the first segment of the link and the first wall of the structural member; and a second connector disposed between the third segment of the link and the second wall, wherein at least one of the first connector and the second connector is adjustable to vary tension in the second segment of the link and to vary stiffness of the structural member, wherein the link is configured to increase or decrease the stiffness.

2. The system of claim 1, comprising:

a head restraint of the vehicle seat coupled with the structural member; and a frame in the vehicle seat, wherein the structural member comprises a part of the frame.

3. The system of claim 1, wherein:

the structural member forms a pocket, and the link is disposed in the pocket.

4. The system of claim 1, comprising a web and a third wall, wherein:

the first wall comprises a first leg of the structural member, the third wall comprises the web, the second wall comprises a second leg of the structural member, the web extends between the first leg and the second leg forming a C-shape, and the link is connected with the first leg, with the web and with the second leg.

5. The system of claim 1, wherein:

the vehicle seat has a back, and the structural member comprises an upper cross member of the back.

6. The system of claim 1, comprising a head restraint on the vehicle seat, wherein the at least one of the first connector and the second connector is configured to tune the stiffness to balance a response of the head restraint to expected forces with a response of the head restraint to rebound forces.

7. The system of claim 1, wherein the link comprises a stamping and is disposed to extend along the structural member.

8. The system of claim 1, wherein the channel includes a pair of openings configured to receive shafts of a head restraint.

9. The system of claim 1, wherein the first and second connectors are configured to place the link in either the tension or a compression.

10. The system of claim 1, wherein the first and second connectors comprise first and second threaded fasteners.

11. A system with adjustable stiffness, the system comprising:

a vehicle seat having a frame;

a structural member of the frame of the vehicle seat, the structural member forming a pocket and having a first wall comprising a first leg of the structural member, and a second wall comprising a second leg of the structural member, and a third wall comprising a web of the structural member, wherein the web extends between the first leg and the second leg so that the first leg, the web and the second leg form a channel-like C-shape around the pocket;

a link extending between the first wall and the second wall, the link having a first segment, a second segment and a third segment, wherein the second segment extends between the first segment and the third segment, the first segment configured to be disposed along the first wall and the third segment configured to be disposed along the second wall;

a first connector engaged between the first segment of the link and the first wall of the structural member;

a second connector engaged between the third segment of the link and the second wall of the structural member; and a third connector engaged between the second segment of the link and the third wall of the structural member, wherein the link is connected with the first leg, with the web and with the second leg, wherein at least one of the first connector and the second connector is adjustable to vary tension in the second segment of the link and to vary stiffness of the structural member.

12. The system of claim 11, comprising:

a head restraint of the vehicle seat; and at least one shaft coupling the head restraint with the frame at the structural member.

13. The system of claim 11, wherein:

the link is disposed in the pocket.

14. The system of claim 11, wherein the link is formed with five segments including the first segment, the second segment, the third segment, a fourth segment and a fifth segment, wherein each of the five segments is substantially planar, wherein the link is sized to be received within the pocket.

15. The system of claim 11, wherein:

the vehicle seat has a back, and the structural member is disposed in the back and comprises an upper cross member of the frame.

16. The system of claim 11, comprising a head restraint on the vehicle seat, wherein both the first connector and the second connector are configured to tune the stiffness to balance a response of the head restraint to expected forces with a response of the head restraint to rebound forces.

17. The system of claim 11, wherein the link comprises a metal stamping and is disposed to extend along the structural member in a horizontal direction.

18. The system of claim 11, wherein:

the structural member includes a channel configured to provide the stiffness to the structural member, the structural member includes an angle extending from the channel and configured to increase the stiffness, and the link is configured to increase the stiffness in addition to the increase of the angle.

19. A method for adjustable stiffness, the method comprising:

constructing a vehicle seat;

including a head restraint on the vehicle seat;

including a structural member in the vehicle seat, the structural member having a first wall and a second wall;

extending a link between the first wall and the second wall, the link having a first segment, a second segment and a third segment, with the second segment extending between the first segment and the third segment;

adding a first connector between the first segment of the link and the first wall of the structural member;

adding a second connector between the third segment of the link and the second wall; and adjusting at least one of the first connector and the second connector varying tension in the second segment of the link and varying stiffness of the structural member;

evaluating a balance between an expected force on the head restraint and a rebound force from the head restraint;

determining a baseline stiffness of the structural member based on the evaluating the balance;

creating a base design of the structural member to provide the baseline stiffness; adjusting the baseline stiffness with the link to provide the varying stiffness of the structural member; and reusing the base design in various applications that require different stiffnesses provided by the adjusting the baseline stiffness.

20. The method of claim 19, comprising:

forming the structural member with five segments including the first segment, the second segment, the third segment, a fourth segment and a fifth segment, wherein each of the five segments is substantially planar.

* * * * *